US012547918B2

(12) United States Patent
Woerner et al.

(10) Patent No.: US 12,547,918 B2
(45) Date of Patent: *Feb. 10, 2026

(54) STOCHASTIC CONTROL WITH A QUANTUM COMPUTER

(71) Applicant: International Business Machines Corporation, Armonk, NY (US)

(72) Inventors: Stefan Woerner, Zurich (CH); Panagiotis Barkoutsos, Zurich (CH); Ivano Tavernelli, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 306 days.

This patent is subject to a terminal disclaimer.

(21) Appl. No.: 18/338,744

(22) Filed: Jun. 21, 2023

(65) Prior Publication Data

US 2024/0119325 A1 Apr. 11, 2024

Related U.S. Application Data

(63) Continuation of application No. 16/139,861, filed on Sep. 24, 2018, now Pat. No. 11,816,594.

(51) Int. Cl.
*G06N 10/20* (2022.01)
*G06F 9/38* (2018.01)
*G06F 9/50* (2006.01)
*G06F 15/16* (2006.01)
(Continued)

(52) U.S. Cl.
CPC .......... *G06N 10/20* (2022.01); *G06F 9/3877* (2013.01); *G06F 9/5027* (2013.01); *G06F 15/16* (2013.01); *G06F 17/11* (2013.01); *G06N 7/08* (2013.01)

(58) Field of Classification Search
CPC ........ G06N 10/20; G06N 7/08; G06F 9/3877; G06F 9/5027; G06F 15/16; G06F 17/11
See application file for complete search history.

(56) References Cited

U.S. PATENT DOCUMENTS

| 6,882,992 B1 | 4/2005 | Werbos |
| 2004/0024750 A1 | 2/2004 | Ulyanov et al. |
| 2006/0224547 A1 | 10/2006 | Ulyanov et al. |

(Continued)

FOREIGN PATENT DOCUMENTS

| CN | 108414923 A | 8/2018 |
| CN | 112740240 A | 4/2021 |

(Continued)

OTHER PUBLICATIONS

Kivlichan et al., Quantum Simulation of Electronic Structure with Linear Depth and Connectivity, Feb. 2018. (Year: 2018).*

(Continued)

*Primary Examiner* — Marshall L Werner
(74) *Attorney, Agent, or Firm* — Amin, Turocy & Watson, LLP

(57) ABSTRACT

Techniques for facilitating utilizing a quantum computing circuit in conjunction with a stochastic control problem are provided. In one embodiment, a system is provided that comprises a quantum computing circuit that prepares a quantum state that represents a stochastic control problem. The system can further comprise a classical computing device that determines parameters for the quantum computing circuit.

25 Claims, 11 Drawing Sheets

(51) Int. Cl.
*G06F 17/11* (2006.01)
*G06N 7/08* (2006.01)

(56) References Cited

U.S. PATENT DOCUMENTS

| | | | |
|---|---|---|---|
| 2008/0140749 | A1 | 6/2008 | Amato et al. |
| 2017/0206461 | A1 | 7/2017 | Friesen et al. |
| 2017/0308803 | A1 | 10/2017 | Wallman et al. |
| 2017/0323195 | A1* | 11/2017 | Crawford ............... G06N 3/088 |
| 2018/0157775 | A1 | 6/2018 | Ronagh et al. |
| 2018/0232649 | A1 | 8/2018 | Wiebe et al. |
| 2018/0232652 | A1* | 8/2018 | Curtis ................... G06N 5/022 |

FOREIGN PATENT DOCUMENTS

| | | |
|---|---|---|
| DE | 102013010195 A1 | 12/2014 |
| WO | 2018/089792 A1 | 5/2018 |
| WO | 2020/064329 A1 | 4/2020 |

OTHER PUBLICATIONS

The State Intellectual Property Office of People's Republic of China, "Notification of Grant", Apr. 1, 2025, 8 Pages, CN Application No. 201980061970.3.

Puterman et al., "Markov Decision Processes—Discrete Stochastic Dynamic Programming", Bulletin of Mathematical Biology, 1995, vol. 57, No. 3, pp. 499-506.

Bertsekas, Dimitri P., "Approximate Dynamic Programming", Dynamic Programming and Optimal Control, Nov. 2011, chapter 6, 3rd Ed., vol. 11, Massachusetts Institute of Technology, 233 pages.

Moll et al., "Quantum Optimization Using Variational Algorithms on Near-term Quantum Devices", Oct. 9, 2017, arXiv:1710.01022v2 [quant-ph], 30 pages.

Peruzzo et al., "A Variational Eigenvalue Solver on a Photonic Quantum Processor", Nature Communications, Jul. 23, 2014, , 7 pages.

Abbrams et al., "Fast Quantum Algorithms for Numerical Integrals and Stochastic Processes", Aug. 28, 1999, arXiv: quant-ph/9908083v1, 15 pages.

Brassard et al., "Quantum Amplitude Amplification and Estimation", May 2000, 32 pages.

Papageorgiou et al., "Quantum Algorithms for Continuous Problems and their Applications", Dec. 15, 2011, 37 pages.

Bhatnagar et al., "Stochastic Recursive Algorithms for Optimization-Simultaneous Perturbation Methods", Lecture Notes in Control and Information Sciences, 2013,Springer, vol. 434, 309 pages.

Nocedal et al., "Numerical Optimization," 2006, Springer, 651 pages.

Barenco et al., "Elementary Gates for Quantum Computation", The American Physical Society, Nov. 1995, vol. 52, No. 5, 11 pages.

International Search Report and Written Opinion received for PCT Application Serial No. PCT/EP2019/074179 dated Dec. 19, 2019, 17 pages.

Keutchayan et al.,"Quality Evaluation of Scenario-tree Generation Methods for Solving Stochastic Programming Problems", Computational Management Science, vol. 14, No. 3, May 19, 2017, pp. 333-365.

Non-Final Office Action received for U.S. Appl. No. 16/139,861, dated Feb. 15, 2022, 110 pages.

Amin et al.,"Quantum Boltzmann Machine", Physical Review, Jan. 2016, 10 pages.

Final Office Action received for U.S. Appl. No. 16/139,861, dated Jun. 15, 2022, 85 pages.

Guerreschi et al.,"Practical Optimization for Hybrid Quantum-Classical Algorithms", arXiv:1701.01450v1 [quant-ph], Jan. 9, 2017, 25 pages.

Rebentrost et al.,"Quantum Comptational Finance: Monte Carlo Pricing of Financial Derivative", Physical Review A, vol. 98, No. 022321, Aug. 20, 2018, 15 pages.

Non-Final Office Action received for U.S. Appl. No. 16/139,861, dated Jan. 6, 2023, 80 pages.

Kivlichan et al.,"Quantum Simulation of Electronic Structure with Linear Depth and Connectivity", Physical Review Letters, Feb. 2018, 8 pages.

Notice of Allowance received for U.S. Appl. No. 16/139,861, dated Apr. 25, 2023, 27 pages.

List of IBM Patents or Applications Treated as Related.

The State Intellectual Property Office of People's Republic of China, "First Office action", Nov. 30, 2024, 08 Pages, CN Application No. 201980061970.3.

* cited by examiner

900

```
┌─────────────────────────────────────────────────────────┐
│ PREPARING, BY A QUANTUM COMPUTING CIRCUIT OF A          │
│ COMPUTING SYSTEM, A QUANTUM STATE THAT REPRESENTS       │
│ A STOCHASTIC CONTROL PROBLEM, THE QUANTUM STATE         │── 902
│ CORRESPONDING TO A FIRST NUMBER OF QUBITS, THE          │
│ STOCHASTIC CONTROL PROBLEM CORRESPONDING TO A           │
│ POLICY-SCENARIO TREE THAT HAS A FIRST SIZE, WHEREIN     │
│ THE FIRST NUMBER OF QUBITS IS LOGARITHMICALLY           │
│ SMALLER THAN THE FIRST SIZE                             │
└─────────────────────────────────────────────────────────┘
                              │
                              ▼
┌─────────────────────────────────────────────────────────┐
│ DETERMINING, BY A CLASSICAL COMPUTING DEVICE OF THE     │── 904
│ COMPUTING SYSTEM, PARAMETERS FOR THE QUANTUM            │
│ COMPUTING CIRCUIT                                       │
└─────────────────────────────────────────────────────────┘
```

Fig. 9

STOCHASTIC CONTROL WITH A QUANTUM COMPUTER

BACKGROUND

The subject disclosure relates to quantum computing devices, and more specifically, combining quantum computing techniques with stochastic control problems. A stochastic control problem is a subset of control theory (e.g., controlling a continually operating dynamic system) that generally attempts to account for uncertainty in observations, or uncertainty in noise that drives evolution of the associated system. In a stochastic control problem, random noise with a known probability distribution can affect the evolution and observation of the state variables of the stochastic control problem. In a stochastic control problem, an aim can be to design a time path of the controlled variables so as to perform the associated control task with a minimum cost. Then, a Markov decision problem generally is a discrete-time stochastic control problem.

Stochastic control problems and Markov decision problems can be used to model various processes arising in areas like supply chain management, finance, or control of energy systems. In such problems, a system starts in an initial state (e.g., by inventory level and open purchase orders), then a decision is made (e.g., a purchase order is placed), and some uncertainty is observed (e.g., new customer demands). In each time period, a known transition law can be applied to the state, decision, and observed period uncertainty to determine the state in the next time period. This approach can be repeated either for a finite or an infinite horizon. In some examples, in each period, immediate cost (or reward) can be observed based on the state and the decision. The overall goal can be to find a policy that determines the decision for each state and time period such that the average/total/discounted cost (or reward) is minimized (or maximized). In some examples, such problems cannot be solved to optimality due to a complexity of dimensionality, i.e., the exponential growth of state and action spaces with their dimension.

More formally, such problems can be described as follows. Let $x_t$ be a state at period t, where initial state $x_0$ is given. Let $u_t$ be a decision at period t (chosen by some policy). Let $w_t$ be an uncertainty at time t (following a given probability distribution or stochastic process). Then, the transition law can be expressed as $x_{t+1}=f_t(x_t, u_t, w_t)$ with immediate costs: $c_t(x_t, u_t)$. The objective function can then be expressed as $\Sigma_{t=0}^T c_t(x_t, u_t)$, to compute a total cost over a finite time horizon. Possible objective functions can include cost/reward; finite/infinite horizon; and average, total or discounted. A goal can be to find a policy $\pi_t(x_t)=u_t$ that minimizes (or maximizes) the total/average/discounted cost (or reward).

There have been classical computing approaches taken to solving problems of this type. However, there are several problems with utilizing classical computing approaches to solve stochastic control problems, some of which are well known.

For example, exact classical solutions (e.g., value iteration, policy iteration, or linear programming) scale exponentially in the problem dimension, i.e., they suffer from a complexity of dimensionality. Thus, they can only be applied to small problem instances. Then, where an approximation technique is used instead of an exact classical solution, these approximation techniques often scale only slightly better than the exact techniques, or they require a lot of customization (e.g. choice of basis functions) which reduce their applicability.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, combinations of quantum computing techniques with stochastic control are described.

According to an embodiment, a system is provided. In one example, the system comprises a quantum computing circuit that prepares a quantum state that represents a stochastic control problem. In one or more implementations, the system can further comprise a classical computing device that determines parameters for the quantum computing circuit. An advantage of this system is that it can be used to determine an objective value for a stochastic control problem more rapidly, and while using fewer computing resources as compared to prior techniques. In one or more implementations, a policy-scenario tree that corresponds to the stochastic control problem has a first size, and a number of qubits of the quantum computing circuit has a second size, the second size being logarithmically smaller than the first size. An advantage of this is that the stochastic control problem can be expressed in a smaller amount of computing resources than the policy-scenario tree would be represented with classical computing techniques.

In another embodiment, a method is provided. In one example, the method comprises preparing, by a quantum computing circuit of a computing system, a quantum state that represents a stochastic control problem. In one or more examples, the method can further comprise determining, by a classical computing device of the computing system, parameters for the quantum computing circuit. An advantage of this method is that it can be used to determine an objective value for a stochastic control problem more rapidly, and while using fewer computing resources as compared to prior techniques. In one or more implementations, the quantum computing circuit comprises a first set of qubits and a second set of qubits, wherein the first set of qubits is associated with a first time, wherein the second set of qubits is associated with a second time, the first time being earlier than the second time, and the method can further comprise entangling, by the quantum computing circuit, the second set of qubits with the first set of qubits. An advantage of this implementation is that entangling qubits enables expressing higher correlation than is possible in corresponding classical systems.

In another embodiment, a computer program product is provided, the computer program product comprising a computer readable storage medium having program instructions embodied therewith. The program instructions by a computer system comprising a quantum computing circuit and a classical computing device to cause the computer system to prepare, by the quantum computing circuit, a quantum state that represents a stochastic control problem. The program instructions executable by the computer system can further cause the system to determine, by the classical computing device, parameters for the quantum computing circuit. An advantage of this is that it can be used to determine an objective value for a stochastic control problem more rapidly, and while using fewer computing resources as compared to prior techniques. In one or more implementations, the program instructions executable by the computer system can further cause the system to apply, by the quantum computing circuit, an initial uncontrolled Y-rotation with a known angle. An advantage of applying this rotation is that it enables initializing a quantum computing circuit with parameters that correspond to the stochastic control problem.

In another embodiment, a system is provided. In one example, the system comprises a quantum computing circuit that prepares a quantum state that represents a stochastic control problem, the quantum state corresponding to a first number of qubits, the stochastic control problem corresponding to policy-scenario tree that has a first size, wherein the first number of qubits is logarithmically smaller than the first size. An advantage of this system is that it can be used to determine an objective value for a stochastic control problem more rapidly, and while using fewer computing resources as compared to prior techniques. In one or more implementations, the system the quantum computing circuit utilizes amplitude estimation or a Monte Carlo simulation to determine an objective value of the stochastic control problem. An advantage of this approach is that it provides an efficient way to determine an objective value for the stochastic control problem.

In another embodiment, a method is provided. In one example, the method comprises preparing, by a quantum computing circuit of a computing system, a quantum state that represents a stochastic control problem, the quantum state corresponding to a first number of qubits, the stochastic control problem corresponding to policy-scenario tree that has a first size, wherein the first number of qubits is logarithmically smaller than the first size. In one or more examples, the method can further comprise determining, by a classical computing device of the computing system, parameters for the quantum computing circuit. An advantage of this method is that it can be used to determine an objective value for a stochastic control problem more rapidly, and while using fewer computing resources as compared to prior techniques. In one or more implementations, the quantum computing circuit comprises a first set of qubits and a second set of qubits, wherein the first set of qubits is associated with a first time, wherein the second set of qubits is associated with a second time, the first time being earlier than the second time, and the method can further comprise entangling, by the quantum computing circuit, the second set of qubits with the first set of qubits. An advantage of this implementation is that entangling qubits enables expressing higher correlation than is possible in corresponding classical systems. In one or more implementations, the method can further comprise utilizing, by the quantum computing circuit, amplitude estimation to determine an objective value of the stochastic control problem. An advantage of this approach is that it provides an efficient way to determine an objective value for the stochastic control problem.

DESCRIPTION OF THE DRAWINGS

FIG. 9 illustrates another block diagram of an example, non-limiting quantum computing system for implementing stochastic control in accordance with one or more embodiments described herein.

DETAILED DESCRIPTION

Figure 1:
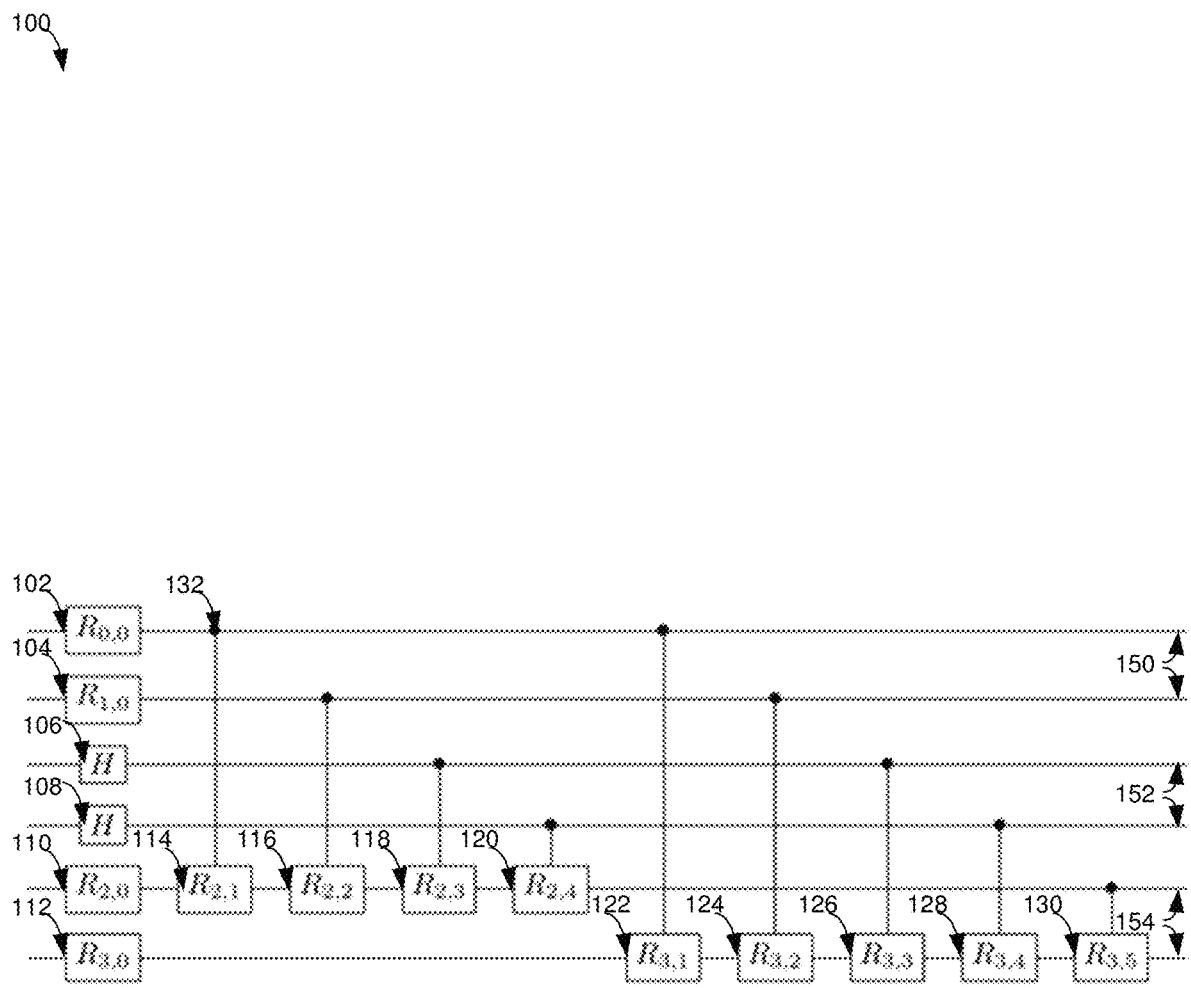
FIG. 1 illustrates an example, non-limiting quantum computing circuit that can be used with a stochastic control problem.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Referring again to utilizing A solution to problems relating to using classical computing approaches to solve stochastic control problems and Markov decision problems can then be found by implementing the problems with quantum computing (i.e., computing performed via the use of quantum-mechanical phenomena). An exponentially-growing policy-scenario tree of a stochastic control problem can be efficiently represented through the quantum state of a logarithmically-smaller set of qubits (i.e., a two-state quantum-mechanical system), which can be prepared by a parameterized quantum computing circuit. The corresponding value of the considered objective function can be estimated by applying quantum amplitude estimation, and classical optimization techniques can be used to determine the optimal parameters.

Utilizing quantum amplitude estimation in quantum computing can also provide a solution to the problems associated with classical computing in this field, can be quadratically more efficient than classical Monte Carlo estimation. In other words, to improve accuracy by a factor of 10, 100 times more samples would be used with classical computing, whereas only 10 times more samples would be used with quantum computing.

In embodiments, quantum techniques can be used to estimate an objective value for a given set of angles for the qubits of a quantum computing circuit. For example, the quantum computing circuit can be sampled (e.g., 10,000 times) for a given set of values to give an estimate of an objective value. Then, given this estimate from quantum techniques, classical techniques can be utilized to find the best angles (in terms of the objective value). One way that a quantum computing circuit can be evaluated is with amplitude estimation, which provides for extracting an objective value for a given set of parameters. In some examples, an objective value can be estimated quadratically faster than sampling in a quadratic way, and this is where a quantum advantage can come from to some classical techniques.

In particular for simulations of larger systems (e.g. supply chains) such a speed up can be crucial for the practical applicability of an optimization approach. Furthermore, a quantum computing circuit can be mapped to existing devices such that the circuit depth increases only linearly with the number of qubits, which makes it applicable to real devices where the circuit depth is limited due to decoherence and dephasing.

The scenario tree spanned by uncertainty and policy can increase exponentially with the number of considered periods. Due to entanglement and superposition, a quantum state can represent an exponentially large object for a given number of qubits (for n qubits, a corresponding dimension of state space can equal 2n). Furthermore, a quantum state can allow modeling arbitrary discrete multivariate random distributions. This exponential scenario tree (with $O(2^n)$ nodes) can be represented by a quantum system with logarithmically fewer qubits ($O(n)$). The circuit depth of a quantum computing circuit can then increase only linearly, and the number of parameters can then increase only quadratically with the number of qubits. This can provide a very general approach with a favorable scaling to compute good policies for stochastic control problems and a quadratic speed up compared to a classical realization of an approach to solve a stochastic control problem.

One approach to addressing a stochastic control problem can be to construct quantum states that represent good policies for stochastic control problems. This can be achieved by following a hybrid approach: a parameterized quantum computing circuit can efficiently prepare a quantum state representing the exponentially large policy and scenario tree. Amplitude estimation can be applied to determine the objective value corresponding to given parameters quadratically faster than classical approaches. A classical optimization algorithm can determine the optimal parameters of the quantum computing circuit. In the following, an appropriate quantum computing circuit can be described, along with efficient mappings to different quantum hardware; the objective function can be evaluated and optimized for given parameters; versions of the overall optimization process are described; and an example with inventory management is considered.

With regard to estimating objective value, one option to evaluate the objective function can be to measure the qubits, derive the state/action trajectories $x_t/u_t$, and evaluate the objective function classically. This can be a valid approach, but may not lead to a quantum advantage, since it could be performed classically as well. However, in some examples, with a quantum computer the objective function can be evaluated for every scenario in parallel and then use quantum amplitude estimation techniques to estimate the objective value with a quadratic speed up compared to classical approaches.

Next, classical optimization schemes can be applied to determine the optimal parameters, and thus, the optimal policy. Suitable classical optimization algorithms can be (variants of) a simultaneous perturbation stochastic approximation (SPSA) approach or a Broyden-Fletcher-Goldfarb-Shanno (BFGS) approach.

Note that the same approach can be applied to determine other properties of the policy, e.g. the variance of the objective function, or the value of constraints to the system (e.g. customer service level in the inventory management example). In some examples, these additional properties can be either be combined with the primary objective function into a weighted objective function, or they can be added as constraints, either as a penalty term of the (classical) objective, or by using a different classical solver.

The present approach can be utilized to determine the expected costs for an optimal policy (representable by a quantum computing circuit as described herein) and the modeled time horizon. Furthermore, the resulting optimal parameters can be used to sample the resulting optimal decision for the first time period (the policy can be stochastic). If it is determined that the policy should be applied in practice, it can be straight forward to fix applied decisions and observed realizations of uncertainty in the circuit or truncate the circuit and adjust the initial state to determine the following decisions.

In examples where the real planning horizon is longer than the act modeled time horizon, it can be possible to re-optimize in every time period and apply the method in a rolling horizon setup. Embedding the policies resulting from this approach in a rolling horizon simulation can allow for evaluating the performance for arbitrary planning horizons.

FIG. 1 illustrates an example, non-limiting quantum computing circuit 100 that can be used with a stochastic control problem. Quantum computing circuit 100 can serve as a solution to a problem of efficiently computing solutions to stochastic control problems. Quantum computing circuit 100 can be utilized to represent decisions of a stochastic control problem over multiple time steps, as well as uncertainty, using qubits. Here, the first two qubits encode a decision (in an example that utilizes a binary tree), the second two qubits encode uncertainty, and the following two qubits encode a decision at a second time stamp. Two qubits can be utilized to encode four states at once. For example, the first decision can be {0, 1, 2, 3}—e.g., in an inventory management problem, the first decision can entail ordering nothing, or 1, 2, or 3 additional units. Similarly, the uncertainty can be {0, 1, 2, 3}, and in an inventory management problem, the uncertainty can entail a customer buying 0, 1, 2, or 3 units in a given time period.

Y-rotation can be applied to qubits (to give the qubits a rotation angle $theta_{ij}$) so that the qubits can be prepared to have an even probability between 0, 1, 2, and 3, or so that there is a specific probability of those various values occurring. In some embodiments, optimal parameters for rotation angles can be determined through classical approaches. In some embodiments, uncertainty qubits are prepared with gates that are not Y-rotation gates. In some embodiments, uncertainty qubits can be controlled by previous qubits.

In a quantum computing circuit, such as quantum computing circuit 100, the set of qubit indices can be denoted by $Q:=\{1, \ldots, n\}$, and a particular qubit denoted by q[i] for i in Q. Qubits can either represent part of a decision in a certain time period t or part of the uncertainty in t, and Q can be decomposed into $D_t$, $U_t$, t=0, . . . , T. Knowing the decisions and observations of the uncertainty up to period t as well as the initial state $x_0$ can allow for constructing a complete state trajectory $x_0$, $x_1$, . . . , $x_t$ by repeatedly applying the transition law f(x, u, w). In some examples, it can be assumed that gates can only be placed at discrete positions k=0, 1, 2, . . . which match for all qubits. Two gates applied to different qubits but at the same position k, are applied at the same time.

Consider an example where the initial quantum state is |0>. Quantum computing circuit 100 can consist of an initialization step that applies an initial uncontrolled Y-rotation with angle \theta$_{\{i\}}$ to all q[i], i in $D_t$, t=0, . . . , T. Furthermore, the initialization phase can prepare the state of all q[j], j in $U_t$, t=0, . . . , T−1, such that they follow the same multivariate distribution as ($w_0$, . . . , $w_{\{T-1\}}$), which, in some examples, can always be achieved.

Next, quantum computing circuit 100 can apply controlled Y-rotations with control q[i], target q[j], and angle \theta$_{\{i,j\}}$ for all (i,j) in C:={i in Q, j in $D_t$|t>0 & i<j} and denote them by R$_{\{i,j\}}$. In other words, in some examples, each decision qubit can be entangled with all qubits carrying information about earlier time periods, as well as with all qubits carrying information about the same time period but with a smaller index. In some examples, the only exceptions are the qubits q[i], i in Do, which can be set directly and do not depend on any other qubits. In some examples, for every set of \theta$_{\{i,j\}}$, (i,j) in C, this prepares a quantum state that defines a policy and spans the corresponding scenario tree for all possible realizations of the uncertainty.

Quantum computing circuit 100 presents an example for n=6, T=1, $D_0$={1,2}, $U_0$={3,4}, $D_1$={5,6}. As Depicted $D_0$ 150 is used to determine the first decision, and in the present example the decision is used to encode {0, 1, 2, 3}. $D_0$ 150 includes $R_{0,0}$ 102, and $R_{1,0}$ 104, which are each depicted as a controlled Y-rotation gate, with rotation angle theta$_{ij}$. Then, $U_0$ is used to represent uncertainty, and is depicted as having uncertainty gate H 106 and uncertainty gate H 108. In some examples, the value for each of uncertainty gate H 106 and uncertainty gate H 108 can remain constant. In an example, the uncertainty $w_0$ follows a uniform distribution on {0, 1, 2, 3}, which is achieved by applying Hadamard gates to each q[j], j in $U_0$, combined with the mapping $w_0$=q[3]*2^1+q[4]*2^0.

Similar to $D_0$ 150, $D_1$ 154 is used to determine the second decision—e.g., as depicted, encodes {0, 1, 2, 3} depending on the first decision from $D_0$ 150 and an observation of the first uncertainty from $U_0$ 152. $D_1$ 154 includes $R_{2,0}$ 110 and $R_{3,0}$ 112 (as well as $R_{2,1}$ 114, $R_{2,2}$ 116, $R_{2,3}$ 118, $R_{2,4}$ 120, $R_{3,1}$ 122, $R_{3,2}$ 124, $R_{3,3}$ 126, $R_{3,4}$ 128, $R_{3,5}$ 130), which are also each depicted as a control Y-rotation gate, with rotation angle theta$_{ij}$.

As depicted, $R_{2,1}$ 114 is based on a result from $R_{0,0}$ 102 (depicted as utilizing communication connection 132) and $R_{2,0}$ 110. Similarly, lines depict that $R_{2,2}$ 116 is determined based on $R_{1,0}$ 104 and $R_{2,1}$ 114; $R_{2,3}$ 118 is determined based on H 106 and $R_{2,2}$ 116; $R_{2,4}$ 120 is determined based on H 108 and $R_{2,3}$ 118; $R_{3,1}$ 122 is determined based on $R_{0,0}$ 102 and $R_{3,0}$ 112; $R_{3,2}$ 124 is determined based on $R_{0,1}$ 104 and $R_{3,1}$ 122; $R_{3,3}$ 126 is determined based on H 106 and $R_{3,2}$ 124; $R_{3,4}$ 122 is determined based on H 106 and $R_{3,3}$ 126; and $R_{3,5}$ 130 is determined based on $R_{2,4}$ 120 and $R_{3,4}$ 128.

FIG. 1 depicts that there are two time steps—one time step associated with $R_{0,0}$ 102 and $R_{1,0}$ 104, as well as the associated uncertainty represented by H 106 and H 108; and a second time step associated with $R_{2,0}$ 110 and $R_{3,0}$ 112. It can be appreciated the depiction in FIG. 1 is an example, and that similar techniques can be applied to situations with more qubits per time step and/or more time steps.

Figure 2:
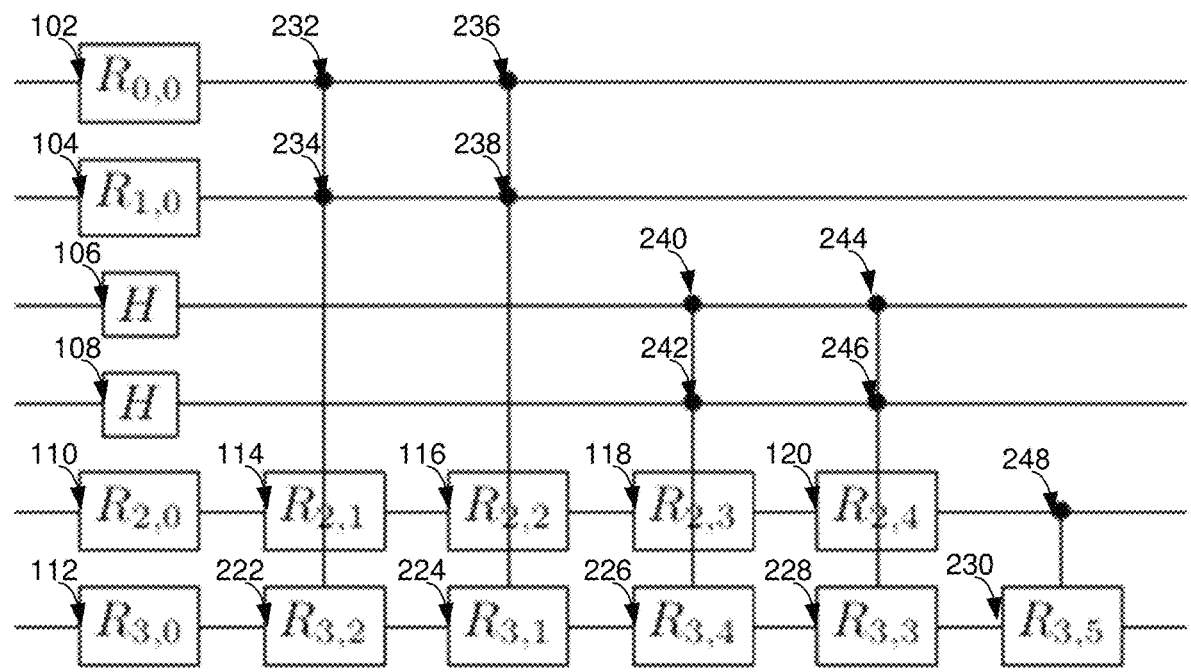
FIG. 2 illustrates an example, non-limiting quantum computing circuit that is a compressed version of the quantum computing circuit 100 of FIG. 1.

FIG. 2 illustrates an example, non-limiting quantum computing circuit 200 that is a compressed version of the quantum computing circuit 100 of FIG. 1. Quantum computing circuit 200 can serve as a solution to a problem of efficiently computing solutions to stochastic control problems.

Even though the number of parameters (i.e. rotation angles \theta$_{\{i,j\}}$) can increase quadratically with n, mappings of the circuit can be provided to different hardware that only increase linearly with n. Since error rates of current hardware can limit the depth of feasible quantum computing circuits. To compress the circuit (such as with quantum computing circuit 200, which represents a compressed version of quantum computing circuit 100), it can be noted that the order of R$_{\{i,j\}}$, (i,j) in C can be changed as long as casual relations are preserved, i.e., all rotations targeting a certain qubit can need to be applied before this qubit is used as control for a rotation targeting another qubit. Since, in this example, qubits in $U_t$, t=0, . . . , T, are not modified after initialization, they can be used as control at any time.

Consider an example of a quantum chip with all-to-all connectivity between the qubits. In this example, the following simple greedy algorithm achieves minimal possible circuit depths equal to [I+cR*n], where I denotes the length of an initialization phase, and cR the length of a controlled Y-rotation (usually this involves 2 uncontrolled Y-rotations and 2 CX gates):

1.) Run the initialization phase of the circuit.
2.) For all (i, j) in C apply R$_{\{i,j\}}$ in lexicographical order at the first feasible position k.

In this example, feasibility in step 2 can require that, for every qubit, q[i], i in Q, a position k=0, 1, . . . is never used twice and that the causal dependencies are respected.

As stated, quantum computing circuit 200 represents a compressed version of quantum computing circuit 100. Like with quantum computing circuit 100, quantum computing circuit 200 comprises six gates. A general difference between quantum computing circuit 100 and quantum computing circuit 200 is that, quantum computing circuit 200 performs multiple decisions for $D_1$ 154 at the same time (e.g., $R_{2,1}$ 114 and $R_{3,2}$ 222 are calculated at the same time)—i.e., in quantum computing circuit 100 all gates are sequential, whereas quantum computing circuit 200 has gates in parallel. Looking at the parallel operation, for example, $R_{2,1}$ 114 and $R_{3,2}$ 222 operate upon disjoint sets of qubits, so in this example, can operate in parallel.

As depicted, $R_{2,1}$ 114 is determined based on $R_{2,0}$ 110 and $R_{0,0}$ 102 (by utilizing communication connection 232); $R_{2,2}$ 116 is determined based on $R_{2,1}$ 114 and $R_{1,0}$ 104 (by utilizing communication connection 238); $R_{2,3}$ 118 is determined based on $R_{2,2}$ 116 and H 106 (by utilizing communication connection 240); $R_{2,4}$ 120 is determined based on $R_{2,3}$ 118 and H 106 (by utilizing communication connection 246); $R_{3,2}$ 222 is determined based on $R_{3,0}$ 112 and $R_{1,0}$ 104 (by utilizing communication connection 234); $R_{3,2}$ 222 is determined based on $R_{3,0}$ 112 and $R_{1,0}$ 104 (by utilizing communication connection 234); $R_{3,1}$ 224 is determined based on $R_{3,2}$ 222 and $R_{0,0}$ 102 (by utilizing communication connection 236); $R_{3,4}$ 226 is determined based on $R_{3,1}$ 224 and U 108 (by utilizing communication connection 242); $R_{3,3}$ 228 is determined based on $R_{3,4}$ 226 and U 106 (by utilizing communication connection 244); and $R_{3,5}$ 230 is determined based on $R_{3,3}$ 228 and $R_{2,4}$ 120 (by utilizing communication connection 248).

Figure 3:
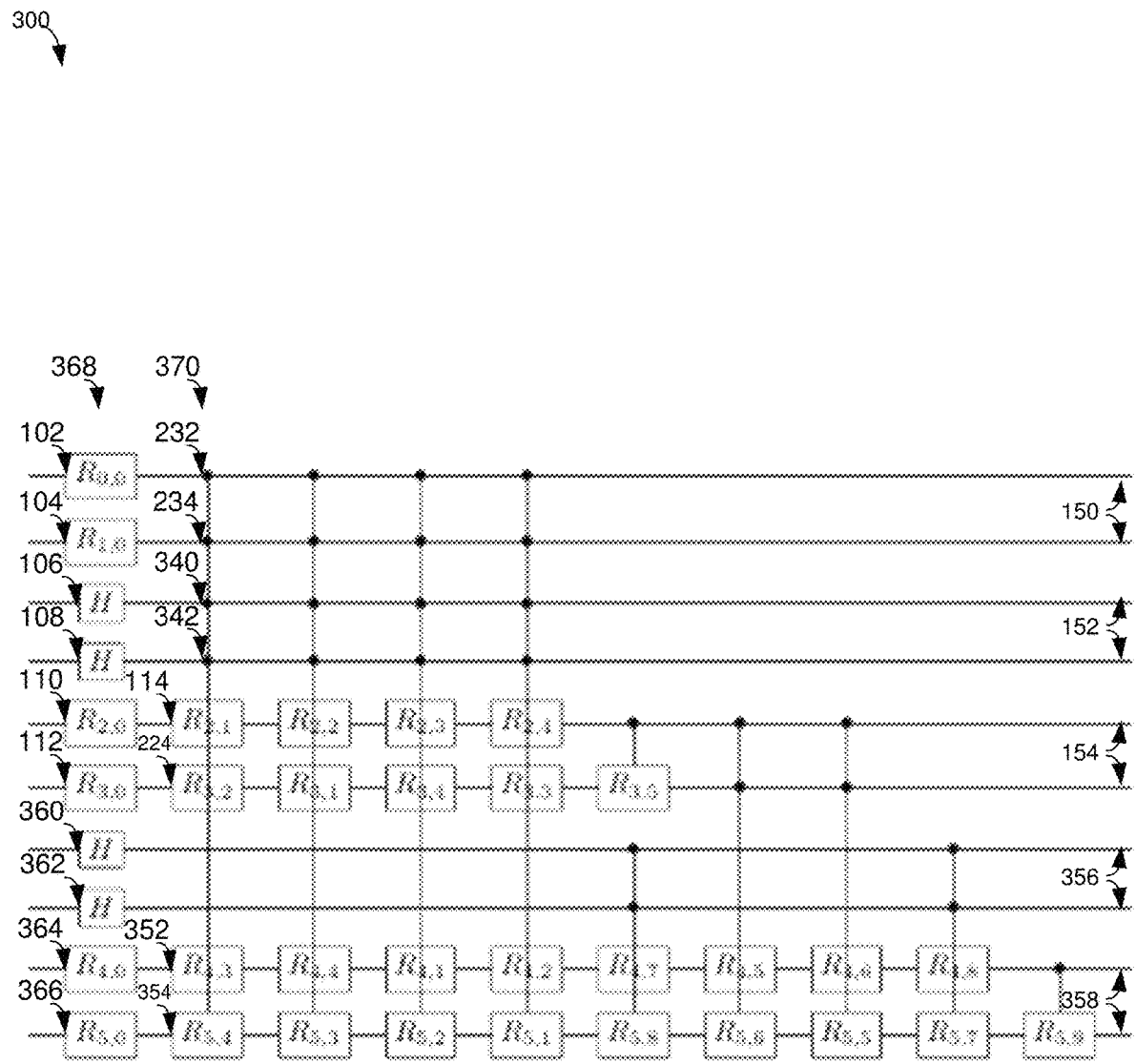
FIG. 3 illustrates an example, non-limiting quantum computing circuit that is a version of the quantum computing circuit 100 of FIG. 1 for T=2.

FIG. 3 illustrates an example, non-limiting quantum computing circuit 300 that is a version of the quantum computing circuit 100 of FIG. 1 for T=2. Quantum computing circuit 300 can serve as a solution to a problem of efficiently computing solutions to stochastic control problems.

Whereas quantum computing circuit 200 shows a compressed version of quantum computing circuit for T=1 (quantum computing circuit 100 depicting T=1), quantum computing circuit 300 extends this compression for T=2. That is, quantum computing circuit 200 shows an example for n=6, T=1, $D_0$=11,21, $U_0$={3,4}, $D_1$={5,6}. Then, quantum computing circuit 300 shows an example for n=10, T=2, $D_0$={1,2}, $U_0$={3,4}, $D_1$={5,6}, $U_1$={7,8}, $D_2$={9,10}. In an uncompressed example where all operations are performed sequentially (such as quantum computing circuit 100), the length of the quantum computing circuit grows quadratically with the number of qubits. Here, there is compression (e.g., operations performed in parallel), so the length of the quantum computing circuit grows as a subquadratic rate.

As depicted, quantum computing circuit 300 includes $U_1$ 356, which is used to represent uncertainty (between the second decision and the third decision), and is depicted as having uncertainty gate H 360 and uncertainty gate H 362. $D_2$ 358 is used to determine the third decision.

The determinations made in time period 368 are as follows. $R_{2,1}$ 114 is determined based on $R_{2,0}$ 110 and $R_{0,0}$ 102 (by utilizing communication connection 232); $R_{3,2}$ 222 is determined based on $R_{3,0}$ 112 and $R_{1,0}$ 104 (by utilizing communication connection 234); $R_{4,3}$ 244 is determined based on $R_{4,0}$ 364 and H 106 (by utilizing communication connection 340); and $R_{5,4}$ 346 is determined based on $R_{5,0}$ 366 and H 108 (by utilizing communication connection 342).

After making determinations in time period 368, determinations are made in time period 370, and they are as follows. $R_{2,2}$ 116 is determined based on $R_{2,1}$ 114 and $R_{1,0}$ 104 (by utilizing communication connection 238); $R_{3,1}$ 224 is determined based on $R_{3,2}$ 222 and $R_{0,0}$ 102 (by utilizing communication connection 234); $R_{4,4}$ 352 is determined based on $R_{4,3}$ 344 and H 108 (by utilizing communication connection 350); and $R_{5,3}$ 354 is determined based on $R_{5,4}$ 346 and H 106 (by utilizing communication connection 348).

A similar approach can be taken for making the other determinations depicted in quantum computing circuit 300.

Figure 4:
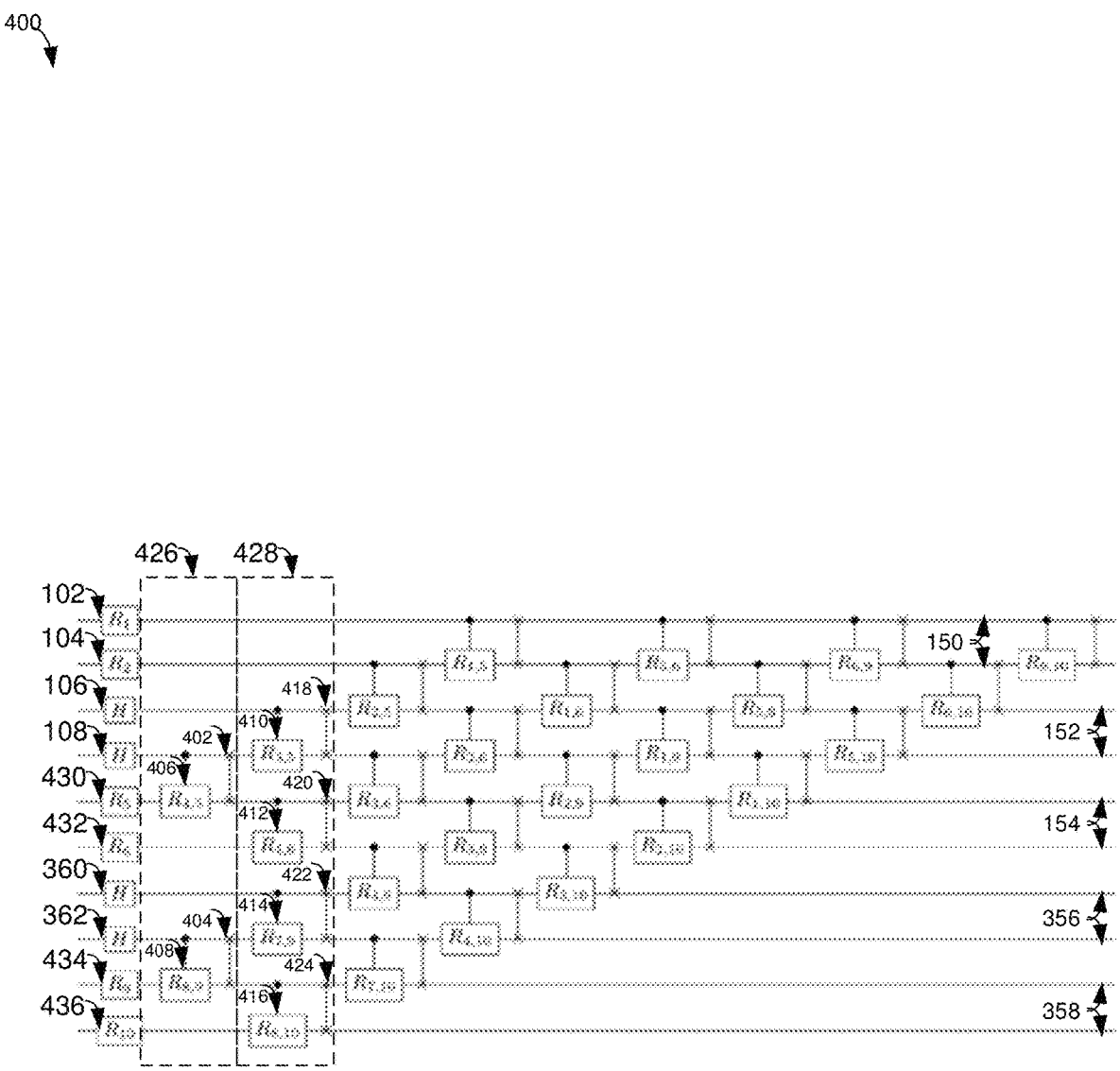
FIG. 4 illustrates an example, non-limiting quantum computing circuit where qubits are swapped.

FIG. 4 illustrates an example, non-limiting quantum computing circuit 400 where qubits are swapped. Quantum computing circuit 400 can serve as a solution to a problem of efficiently computing solutions to stochastic control problems, using a nearest-neighbor qubit architecture. In the example of quantum computing circuit 300, all-to-all connectivity between qubits is utilized. That is, each qubit can access information from, or entangle with, each other qubit of quantum computing circuit 300 at a given time. In contrast, in the example of quantum computing circuit 400, nearest-neighbor connectivity between qubits is utilized. That is, each qubit can access information from, or entangle with, the two qubits that it is neighbors with Like with quantum computing circuit 300, quantum computing circuit 400 utilizes an example for n=10, T=2, $D_0$={1,2}, $U_0$={3,4}, $D_1$={5,6}, $U_1$={7,8}, $D_2$={9,10}.

As depicted, $R_5$ 430, $R_6$ 432, $R_9$ 434, and $R_{10}$ 436 are decision gates; and H 432 and H 434 are uncertainty gates.

In time period 426, $R_{4,5}$ 406 is determined based on H 108 and $R_5$ 430; and $R_{8,9}$ is determined based on H 362 and $R_9$ 434.

Then, swaps also occur during time period 426—i.e., swap 402 and swap 404. In this example, a swap indicates that two qubits exchange the value that they store. Put another way, a swap indicates that the states of two qubits are switched. By swapping the values of two qubits, while those qubits may merely have nearest-neighbor connectivity (as opposed to all-to-all connectivity), those values can move through quantum computing circuit 400 so that all associated determinations can be made for the example.

After time period 426 comes time period 428. As depicted, four determinations and four swaps occur during time period 428. $R_{3,5}$ 410 is determined based on H 106 and $R_{4,5}$ 406 (since swap 402 has occurred); $R_{4,6}$ is determined based on $R_6$ 432 and H 108 (since swap 402 has occurred); $R_{7,9}$ 414 is determined based on H 360 and $R_{8,9}$ 408 (since swap 404 has occurred); and $R_{8,10}$ 416 is determined based on $R_{10}$ 436 and H 362 (since swap 404 has occurred). After these determinations are made during time period 428, swaps also occur—swap 418, swap 420, swap 422, and swap 424.

Similar determinations and swaps are depicted for the remainder of the circuit. A formalized way of expressing this approach can be as follows.

Suppose all qubits are arranged linearly with nearest neighbor connectivity and labeled according to Q. This can be considered to be a realistic setup for currently existing devices. A similar process can be applied here and again used to achieve linear scaling of the circuit depth. As a simple example, suppose $|D_t|=|U_t|=u$, and set $v=n/u$. The following process can compress our circuit such that the circuit depth equals $[I+(cR+S)*((v+1)*u-1)]$, where S denotes the length of a swap gate:

1.) Run the initialization phase of the circuit.
2.) If there are neighboring qubits that should be entangled, apply the corresponding $R_{\{i,j\}}$, then swap the two qubits.
3.) Repeat step 2 until all required $R_{\{i,j\}}$ have been applied.

In some examples, qubits that should be rotated (q[i], i in $D_t$, t>0) are swapped upwards until they are entangled with all qubits with lower index; once they reach the top position, they can be used as control for qubits with higher index and are swapped downwards again. In some examples, qubits that are only used as control (e.g. uncertainty, or qubits where all rotations already have been applied) are swapped downwards until all corresponding rotations have been applied. In some examples, since n*v=n the circuit depth only increases linearly with the number of qubits.

Some stochastic control problems do not require a policy having access to the full history. This can be used to further reduce the circuit depth as well as the number of parameters. Instead of entangling a qubit q[j] with all qubits q[i], i<j, c in some examples, qubits can be entangled only up to a maximal distance (either with respect to their index or with respect to the corresponding time periods).

In some examples, currently available quantum computers (and the gates on them) are not perfect and might have biases, so it can be necessary to calibrate the representation of the random distribution (e.g. add a correction term to rotations) to achieve the desired random behavior. In some examples, this can be achieved by only running the initialization phase and then measuring all qubits q[i], i in $U_t$, t=0, . . . , T−1 and comparing the samples with the target distribution. A classical search heuristic can be applied to the parameters until the samples satisfy some statistical test verifying the desired distribution.

Figure 5:
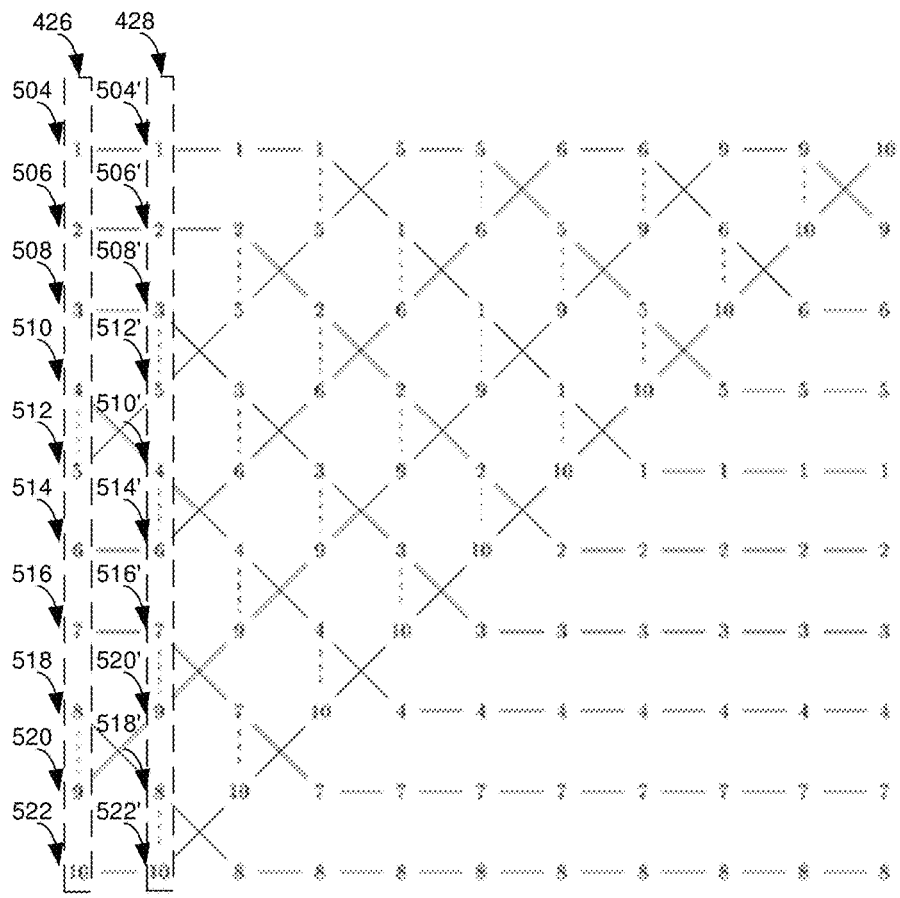
FIG. 5 illustrates an example, non-limiting quantum computing circuit where the swapping paths of the different qubits are emphasized.

FIG. 5 illustrates an example, non-limiting quantum computing circuit 500 where the swapping paths of the different qubits are emphasized. Quantum computing circuit 500 can serve as a solution to a problem of efficiently computing solutions to stochastic control problems. In quantum computing circuit 500, the swapping paths of the different qubits are emphasized relative to those of quantum computing circuit 400, which depicts similar qubit swaps.

As depicted, dashed lines indicate the $R_{\{i,j\}}$ and solid lines indicate the swapping. In some embodiments, the last swapping (between 9 and 10) can be dropped. Here there is u=2, v=5 and thus, the circuit depth equals 133 "1-qubit gate equivalents" (assuming I=1, cR=(2+2*2)=6, S=3*2=6, where it is assumed that 2-qubit gates take twice as long as 1-qubit gates).

At time period 426, the qubits store a plurality of values. It can be appreciated that these values can change over time, such as by performing a determination on a qubit, such as described with respect to quantum computing circuit 100 of FIG. 1. There is value 1 504, value 2 506, value 3 508, value 4 510, value 5 512, value 6 514, value 7 516, value 8 518, value 9 520, and value 10 522.

In time period 426, a $R_{\{i,j\}}$ is performed based on value 4 510 and value 5 512, and then another $R_{\{i,j\}}$ is performed based on value 8 518 and value 9 520. At the end of time period 426, value 4 510 and value 5 512 swap with each other, and value 8 518 and value 9 520 swap with each other.

At time period 428, there is value 1 504' (corresponding to value 1 504 in time period 426), value 2 506' (corresponding to value 2 506 in time period 426), value 3 508' (corresponding to value 3 508 in time period 426), value 4 510' (corresponding to value 4 510 in time period 426), value 5 512' (corresponding to value 5 512 in time period 426), value 6 514' (corresponding to value 6 514 in time period 426), value 7 516' (corresponding to value 7 516 in time period 426), value 8 518' (corresponding to value 8 518 in time period 426), value 9 520' (corresponding to value 9 520 in time period 426), and value 10 522' (corresponding to value 10 522 in time period 426). In time period 428, a $R_{\{i,j\}}$ is performed based on value 3 508' and value 5 512'; based on value 4 510' and value 6 514'; based on value 7 516' and value 9 520'; and based on value 8 518' and value 10 522'. At the end of time period 428, value 3 508' and value 5 512' swap with each other; value 4 510' and value 6 514' swap with each other; value 7 516' and value 9 520' swap with each other; and value 8 518' and value 10 522' swap with each other.

After time period 428, further $R_{\{i,j\}}$ s and swaps are performed as depicted.

Figure 6:
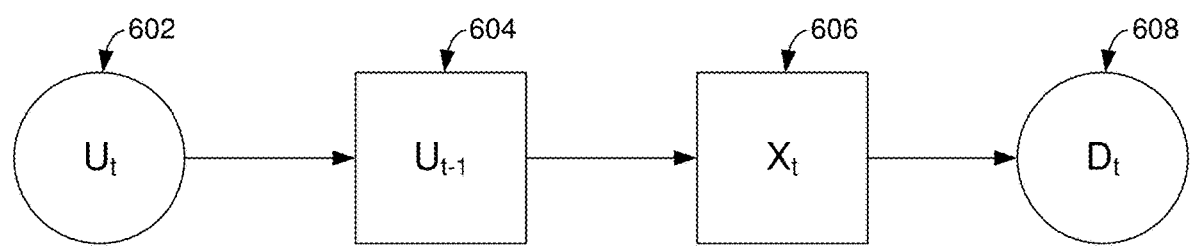
FIG. 6 illustrates an example, non-limiting process flow for inventory management, which represents a stochastic control problem that can be processed with a quantum computing circuit.
Figure 7:
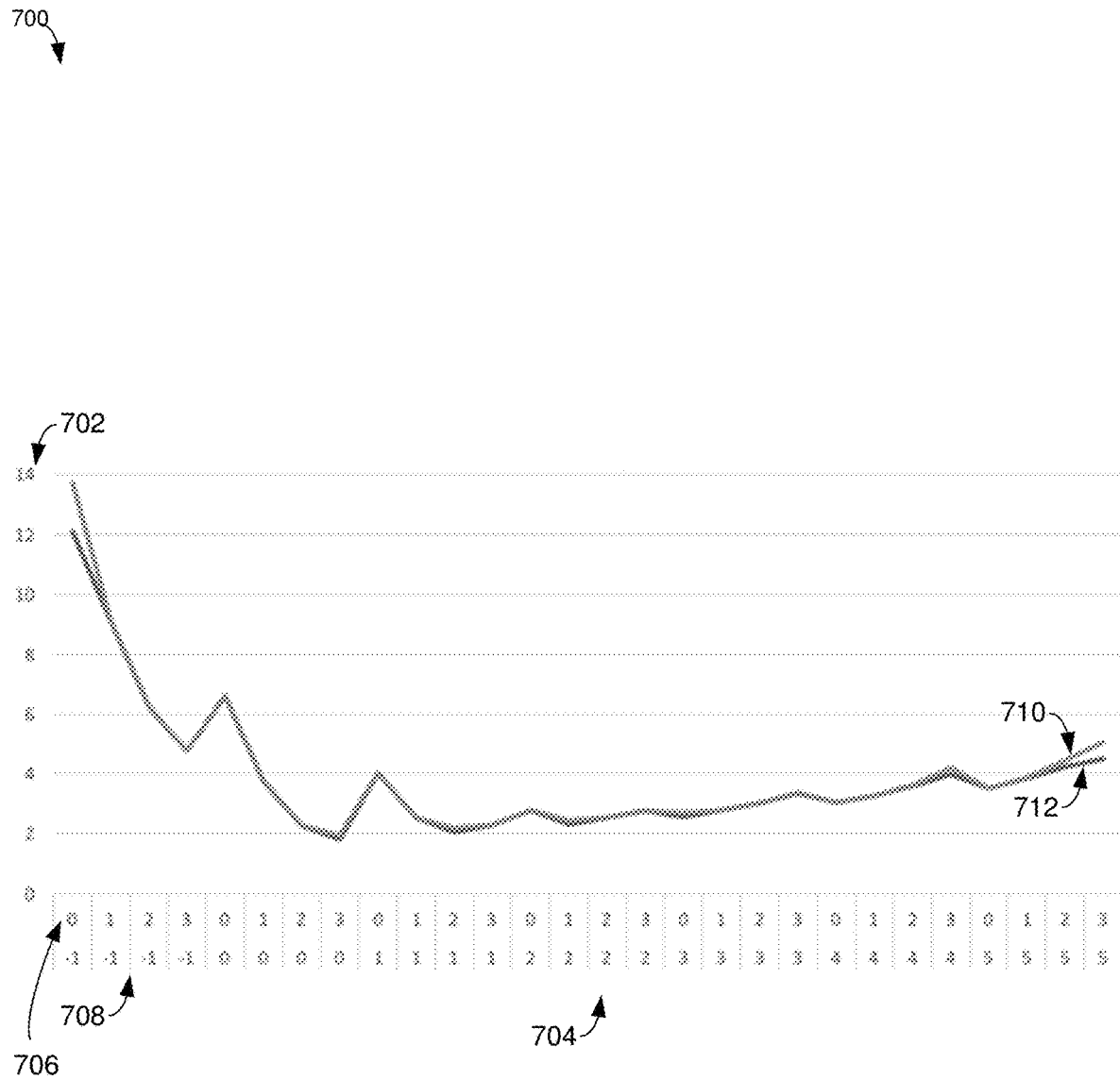
FIG. 7 illustrates an example, non-limiting graph that compares a result of determining an objective value for the stochastic control problem of FIG. 6 with classical computing, and with quantum computing.

FIG. 6 illustrates an example, non-limiting process flow 600 for inventory management, which represents a stochastic control problem that can be processed with a quantum computing circuit. FIGS. 6 and 7 depict an embodiment of the present disclosure that is directed to an inventory management problem. A quantum computing circuit used to address this inventory management problem could be quantum computing circuit 400 of FIG. 4.

In process flow 600, an order at external supplier 602 ($u_t$) is placed. Then, this order reaches the order queue 604 ($u_{t-1}$). Then, the order reaches inventory/backlog at a warehouse 606 ($x_t$). Finally, an order reaches external demand 608 ($d_t$). A lead time, L, between making an order at external supplier 602 and having corresponding inventory/backlog at warehouse 606 is given in this example as 2.

Put another way, in an inventory management problem, a system is in a particular state. Then, at each time stamp, a decision can be made, such as to change the state, determine a result of changing the state that is based on uncertainty, and react to what is learned about the changed state to change the system state again. For instance, in an inventory management problem, inventory can be ordered, then customer demand observed, and inventory can possibly be re-ordered. In such an example, uncertainty can indicate what customers actually buy. Using a simplified example, in a binary tree structure where a customer can either order or not order, one branch from a node of the binary tree structure can indicate no customer demand, and the other branch can indicate demand. Then, if the entity re-orders, but there ends up not being corresponding customer demand, then a policy can indicate not to re-order the next time (because extra inventory is possessed).

To express an inventory management problem more formally, in an example let X be the inventory possessed, U be the inventory ordered, and W be demand of the customer. So, a transition law for this inventory management problem can be expressed as X+1=X+U−W. There are then costs, such as holding costs for inventory, or a cost associated with paying for new inventory, and these costs can be measured by an objective function for the inventory management problem. Then, a policy P, indicates what to do at a given state.

A holding cost for an objective function can by expressed as max($x_t$, 0), and an ordering cost can be $u_t$. Then, the objective function can express an overall average cost for a given time horizon, and rotation angles for a circuit can be determined such that a corresponding objective function is minimized.

FIG. 7 illustrates an example, non-limiting graph 700 that compares a result of determining an objective value for the stochastic control problem of FIG. 6 with classical computing, and with quantum computing.

Graph 700 graphs results for addressing the inventory management problem described with respect to FIG. 6 with a quantum computing circuit (such as quantum computing circuit 400 of FIG. 4), as well as with a BFGS optimizer. Experimental results show that, in some examples, such a quantum computing circuit can approximate the optimal policy for the considered example very well and estimate the corresponding expected costs with an average error of 2.34% (average overall tested initial states).

Graph 700 has Y-axis 702, which represents expected costs for different initial states, and X-axis 704, which represents different initial states. X-axis 704 further has two variables used to represent a particular initial state 706 (which represents order queue 604 from process flow 600), and $x_0$ 708 (which represents inventory/backlog at warehouse 606 from process flow 600).

From this, both an analytical solution 712 and a quantum solution 710 are graphed. As can be seen visually, there is only as most a mild deviation between the values for analytical solution 712 and a quantum solution 710. In this example used, the average deviation between analytical solution 712 and a quantum solution 710 is 2.34%.

Figure 8:
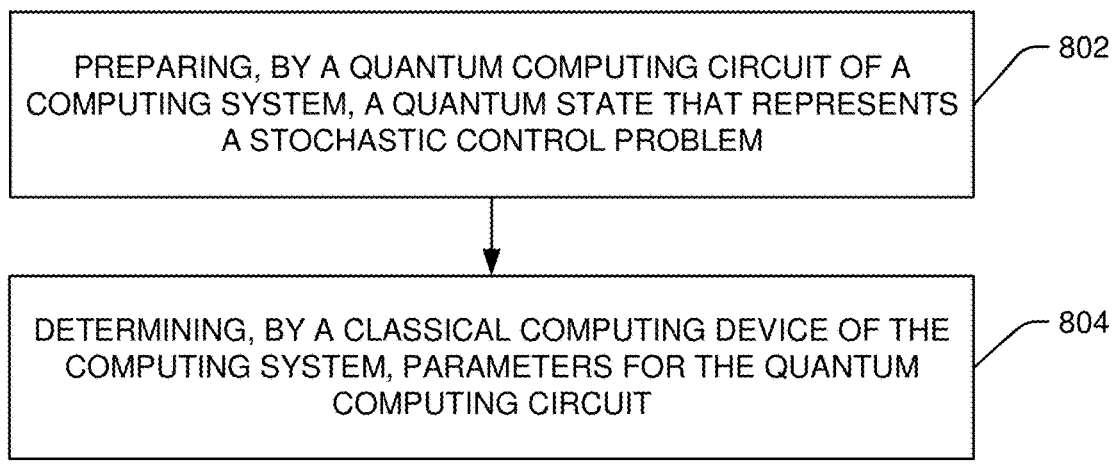
FIG. 8 illustrates a block diagram of an example, non-limiting quantum computing system for implementing stochastic control in accordance with one or more embodiments described herein.

FIG. 8 illustrates a flow diagram of an example, non-limiting computer-implemented method that facilitates utilizing a quantum computing circuit in conjunction with a stochastic control problem. In some examples, flow diagram 800 can be implemented by quantum computing circuit 100, quantum computing circuit 200, quantum computing circuit 300, quantum computing circuit 400, or quantum computing circuit 500. It can be appreciated that the operations of flow diagram 800 can be implemented in a different order than is depicted. It can also be appreciated that the operations of flow diagram 800 can be implemented in a different order than is depicted. Flow diagram 800 can be implemented to provide a solution to a problem of solving a stochastic control problem efficiently.

In non-limiting example embodiments, a computing device (or system) (e.g., computing system 1000) is provided comprising one or more processors and one or more memories that stores executable instructions that, when executed by the one or more processors, can facilitate performance of the operations as described herein, including the non-limiting methods as illustrated in the flow diagram of FIG. 8. As a non-limiting example, the computing device can facilitate performance of the methods by directing or controlling one or more equipment operable to facilitate utilizing a quantum computing circuit in conjunction with a stochastic control problem.

Operation 802 depicts preparing, by a quantum computing circuit of a computing system (e.g., by computing system 1000), a quantum state that represents a stochastic control problem. A stochastic control problem is generally a subset of control theory that attempts to account for uncertainty in observations, or uncertainty in noise that drives evolution of the associated system. Preparing the quantum state that represents a stochastic control problem can comprise creating a representation of the stochastic control problem in a quantum computer system.

In some examples, a policy-scenario tree that corresponds to the stochastic control problem has a first size, and a number of qubits of the quantum computing circuit has a second size, the second size being logarithmically smaller than the first size. In general, a policy of a stochastic control problem is an indication of what to do given a current state. A policy-scenario tree then can indicate what to do given a variety of states that can branch off from each other, based on, e.g., an uncertainty value.

For instance, where uncertainty determines one of two results (e.g., a customer bought one unit of a product, or a customer did not buy a unit of a product), a policy-scenario tree can branch twice at each state. So, such a policy scenario tree would have 2' nodes for n time units at which a policy can be implemented. In contrast to storing 2' nodes, the present techniques using a quantum computing circuit can implement a given policy tree with a logarithmically smaller number of qubits.

More specifically regarding a policy tree, the present techniques can optimize an optimal policy tree with logarithmically fewer qubits than nodes of a corresponding policy tree. For a given time in a stochastic control problem, a policy tree can be approximated for a predetermined number of steps, referred to as T. The qubits corresponding to the first decision of this policy tree can be evaluated, and then a corresponding decision can be implemented, and a corresponding first uncertainty observed.

After the first decision is implemented and corresponding first uncertainty is observed, this technique can be repeated. Starting from this updated state, a second policy tree for the next T time steps can be approximated, and then a decision can be evaluated. In this updated state, it can be the first decision of the second policy tree that is evaluated, which is also a decision corresponding to the second overall time step of the corresponding stochastic control problem. This approach can be referred to as a rolling horizon approach.

In some examples, the quantum computing circuit comprises a parameterized quantum computing circuit. A parameterized quantum computing circuit can comprise a quantum computing circuit where at least one decision gate of the quantum computing circuit has a parameter that describes the associated rotation.

In some examples, the quantum computing circuit utilizes amplitude estimation or a Monte Carlo simulation to determine an objective value of the stochastic control problem. In quantum computing, amplitude estimation can be utilized to estimate the number of x∈X such that $\chi(x)=1$. A Monte Carlo simulation can generally comprise repeatedly random sampling to determine a result.

In some examples, the objective value of the stochastic control problem comprises a cost of the stochastic control problem. A cost of a stochastic control problem can comprise a value that represents how undesirable it is to deviate from an optimal result at a given point (e.g., in an inventory control problem, a cost associated with not having enough inventory, or having to pay to store the inventory that is possessed).

In some examples, the quantum computing circuit swaps a first information in stored in a first qubit and a second information stored in a second qubit as part of compiling the quantum computing circuit to a nearest-neighbor qubit topology. A nearest-neighbor qubit topology can be one where a qubit is configured to exchange information with the qubit or qubits that it is adjacent to, without being configured to exchange information with other qubits (such as would be possible in an all-to-all qubit topology). In some examples, the first qubit and the second qubit are physically located next to each other in the quantum computing circuit.

In some examples, the quantum state further represents a policy of the stochastic control problem. A policy can represent an action to be taken in the stochastic control problem for a given state. In some examples, the quantum state further represents a scenario tree of the stochastic control problem. A scenario tree can represent possible states that can be reached in a stochastic control problem, as well as possible transitions from one state to another.

In some examples, operation 802 also comprises representing, by the quantum computing circuit, a decision corresponding to the stochastic control problem with a qubit that is prepared by applying one or more gates, for instance a Y-rotation gate. In general, a Y-rotation gate is configured to act upon a qubit and equates to a rotation around the Y-axis of the Bloch sphere by $\pi$ radians. In some examples, operation 802 also comprises representing, by the quantum computing circuit, an uncertainty corresponding to the stochastic control problem with a qubit that is prepared by applying one or more gates.

In some examples, the quantum computing circuit comprises a first qubit and a second qubit, wherein the first qubit is associated with a first time, wherein the second qubit is associated with a second time, the first time being earlier than the second time. In such examples, operation 802 can also comprise entangling, by the quantum computing circuit, the second qubit with the first qubit. That is, a quantum computing circuit may execute over multiple time periods, and may have a set of values stored in qubits at each time period. In the process of making a determination, one qubit can entangle with another qubit that has previously made a determination (e.g., in a value for $R_{2,1}$ 114 can be based on $R_{0,0}$ 102 and $R_{2,0}$ 110). In some examples, the quantum computing circuit comprises a third qubit, wherein the third qubit is associated with the second time, and operation 802 also comprises entangling, by the quantum computing circuit, the second qubit with both the first qubit and the third qubit.

In some examples, the quantum computing circuit comprises a first qubit that corresponds to a decision of the stochastic control problem, and operation 802 also comprises applying, by the quantum computing circuit, an initial uncontrolled Y-rotation with a known angle.

In some examples, the quantum computing circuit comprises a plurality of qubits that correspond to an uncertainty of the stochastic control problem, and operation 802 also comprises preparing, by the quantum computing circuit, the state of the plurality of qubits so that the state of the plurality of qubits follow a known multivariate distribution or a stochastic process. In some examples, a multivariate distribution can comprise a multivariate normal distribution or a multivariate Gaussian distribution.

In some examples, the quantum computing circuit determines estimated parameters for the quantum computing circuit, and operation 802 also comprises determining, by the classical computing device, the parameters for the quantum computing circuit based on the estimated parameters.

In some examples, the quantum computing circuit comprises a plurality of qubits that correspond to an uncertainty of the stochastic control problem, and operation 802 also comprises preparing, by the quantum computing circuit, the plurality of qubits so that a plurality of random variables that corresponds to measuring the plurality of qubits follows a target distribution. A target distribution can comprise a known mathematical distribution.

Operation 804 depicts determining, by a classical computing device of the computing system (e.g., by computing system 1000), parameters for the quantum computing circuit. These parameters can include, for example, a Y-rotation with a known angle for a qubit, and can be determined based on a value for an objective function that is determined by the quantum computing circuit in operation 802.

FIG. 9 illustrates another a flow diagram of an example, non-limiting computer-implemented method that facilitates utilizing a quantum computing circuit in conjunction with a stochastic control problem. In some examples, flow diagram 900 can be implemented by quantum computing circuit 100, quantum computing circuit 200, quantum computing circuit 300, quantum computing circuit 400, or quantum computing circuit 500. It can be appreciated that the operations of flow diagram 900 can be implemented in a different order than is depicted. It can also be appreciated that the operations of flow diagram 900 can be implemented in a different order than is depicted. Flow diagram 900 can be implemented to provide a solution to a problem of solving a stochastic control problem efficiently.

In non-limiting example embodiments, a computing device (or system) (e.g., computing system 1000) is provided comprising one or more processors and one or more memories that stores executable instructions that, when executed by the one or more processors, can facilitate performance of the operations as described herein, including the non-limiting methods as illustrated in the flow diagram of FIG. 9. As a non-limiting example, the computing device can facilitate performance of the methods by directing or controlling one or more equipment operable to facilitate utilizing a quantum computing circuit in conjunction with a stochastic control problem.

Operation 902 depicts preparing, by a quantum computing circuit of a computing system (e.g., by computing system 1000), a quantum state that represents a stochastic control problem, the quantum state corresponding to a first number of qubits, the stochastic control problem corresponding to policy-scenario tree that has a first size, wherein the first number of qubits is logarithmically smaller than the first size. In general, a policy of a stochastic control problem is an indication of what to do given a current state. A policy-scenario tree then can indicate what to do given a variety of states that can branch off from each other, based on, e.g., an uncertainty value.

For instance, where uncertainty determines one of two results (e.g., a customer bought one unit of a product, or a customer did not buy a unit of a product), a policy-scenario tree can branch twice at each state. So, such a policy scenario tree would have 2 n nodes for n time units at which a policy can be implemented. In contrast to storing 2 n nodes, the present techniques using a quantum computing circuit can implement a given policy tree with a logarithmically smaller number of qubits.

In some examples, the quantum computing circuit comprises a parameterized quantum computing circuit. A parameterized quantum computing circuit can comprise a quantum computing circuit where at least one decision gate of the quantum computing circuit has a parameter that describes the associated rotation.

In some examples, the quantum computing circuit utilizes amplitude estimation or a Monte Carlo simulation to determine an objective value of the stochastic control problem. In quantum computing, amplitude estimation can be utilized to estimate the number of $x \in X$ such that $\chi(x)=1$. A Monte Carlo simulation can generally comprise repeatedly random sampling to determine a result.

In some examples, the objective value of the stochastic control problem comprises a cost of the stochastic control problem. A cost of a stochastic control problem can comprise a value that represents how undesirable it is to deviate from an optimal result at a given point (e.g., in an inventory control problem, a cost associated with not having enough inventory, or having to pay to store the inventory that is possessed).

In some examples, the quantum computing circuit swaps a first information in stored in a first qubit and a second information stored in a second qubit as part of compiling the quantum computing circuit to a nearest-neighbor qubit topology. A nearest-neighbor qubit topology can be one where a qubit is configured to exchange information with the qubit or qubits that it is adjacent to, without being configured to exchange information with other qubits (such as would be possible in an all-to-all qubit topology). In some examples, the first qubit and the second qubit are physically located next to each other in the quantum computing circuit.

In some examples, the quantum state further represents a policy of the stochastic control problem. A policy can represent an action to be taken in the stochastic control problem for a given state. In some examples, the quantum state further represents a scenario tree of the stochastic control problem. A scenario tree can represent possible states that can be reached in a stochastic control problem, as well as possible transitions from one state to another.

In some examples, operation 902 also comprises representing, by the quantum computing circuit, a decision corresponding to the stochastic control problem with one or more qubits that are prepared with one or more gates, for instance, a Y-rotation gate. In general, a Y-rotation gate is configured to act upon a qubit and equates to a rotation around the Y-axis of the Bloch sphere by $\pi$ radians. In some examples, operation 902 also comprises representing, by the quantum computing circuit, an uncertainty corresponding to the stochastic control problem with one or more qubits that are prepared with one or more gates, for instance, a Y-rotation gate.

In some examples, the quantum computing circuit comprises a first set of qubits and a second set of qubits, wherein the first set of qubits is associated with a first time, wherein the second set of qubits is associated with a second time, the first time being earlier than the second time. In such examples, operation 902 can also comprise entangling, by the quantum computing circuit, the second set of qubits with the first set of qubits. That is, a quantum computing circuit may execute over multiple time periods, and may have a set of values stored in qubits at each time period. In the process of making a determination, one qubit can entangle with another qubit that has previously made a determination (e.g., in a value for $R_{2,1}$ 114 can be based on $R_{0,0}$ 102 and $R_{2,0}$ 110). In some examples, the quantum computing circuit comprises a third set of qubits, wherein the third set of qubits is associated with a third time, and operation 902 also comprises entangling, by the quantum computing circuit, the second set of qubits with both the first set of qubits and the third set of qubits.

In some examples, the quantum computing circuit comprises a first qubit that corresponds to a decision of the stochastic control problem, and operation 902 also comprises applying, by the quantum computing circuit, an initial uncontrolled Y-rotation with a known angle.

In some examples, the quantum computing circuit comprises a plurality of qubits that correspond to an uncertainty of the stochastic control problem, and operation 902 also comprises preparing, by the quantum computing circuit, the state of the plurality of qubits so that the state of the plurality of qubits follow a known multivariate distribution or a stochastic process. In some examples, a multivariate distribution can comprise a multivariate normal distribution or a multivariate Gaussian distribution.

In some examples, the quantum computing circuit determines estimated parameters for the quantum computing circuit, and operation 902 also comprises determining, by the classical computing device, the parameters for the quantum computing circuit based on the estimated parameters.

In some examples, the quantum computing circuit comprises a plurality of qubits that correspond to an uncertainty of the stochastic control problem, and operation 902 also comprises preparing, by the quantum computing circuit, the plurality of qubits so that a plurality of random variables that corresponds to measuring the plurality of qubits follows a target distribution. A target distribution can comprise a known mathematical distribution.

Operation 904 depicts determining, by a classical computing device of the computing system (e.g., by computing system 1000), parameters for the quantum computing circuit. These parameters can include, for example, a Y-rotation with a known angle for a qubit, and can be determined based on a value for an objective function that is determined by the quantum computing circuit in operation 902.

Figure 10:
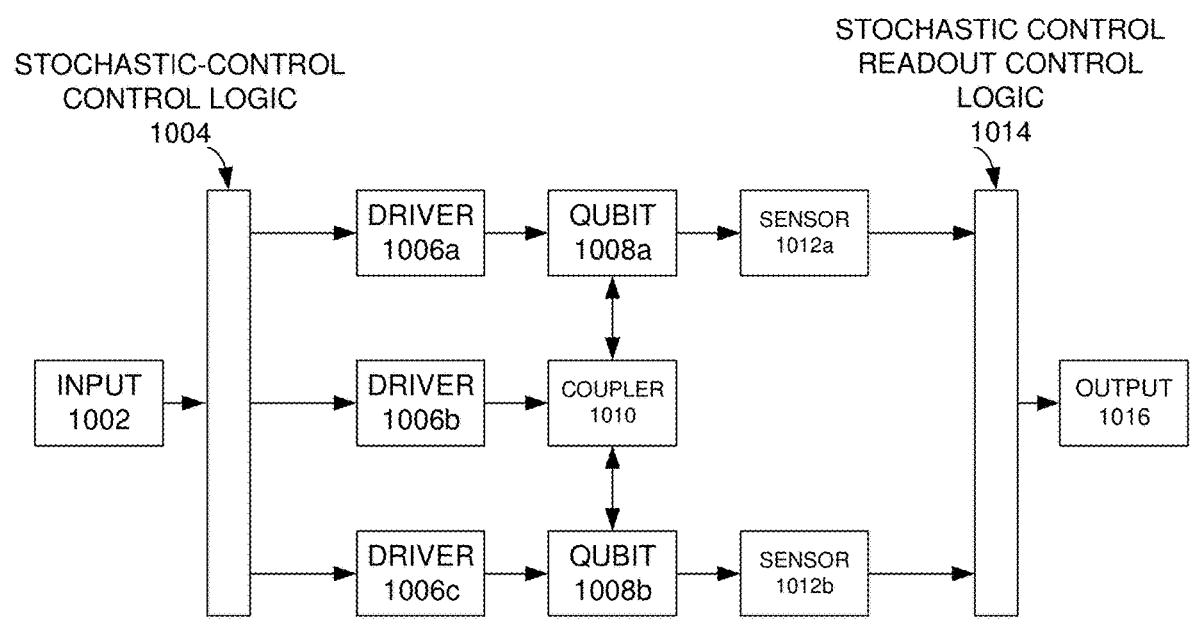
FIG. 10 illustrates a block diagram of an example, non-limiting quantum computing system for implementing stochastic control in accordance with one or more embodiments described herein.

FIG. 10 illustrates a block diagram of an example, non-limiting quantum computing system for implementing stochastic control in accordance with one or more embodiments described herein. More specifically, computing system 1000 can be a simplified example of a quantum computer. It can be appreciated that aspects of the present disclosure can be implemented on a variety of quantum computing hardware, and that the quantum hardware of this example computing system 1000 can be merely one such example that can be utilized to implementing aspects of the present disclosure. In some examples, computing system 1000 can be used to implement aspects of quantum computing circuit 100, quantum computing circuit 200, quantum computing circuit 300, quantum computing circuit 400, or quantum computing circuit 500.

Computing system 1000 comprises input 1002, stochastic-control control logic 1004, driver 1006a, driver 1006b, driver 1006c, qubit 1008a, qubit 1008b, coupler 1010, sensor 1012a, sensor 1012b, stochastic-control readout control logic 1014, and output 1016. Input 1002 can be an input of a stochastic control problem to be solved, and output 1016 can be an objective value or objective function that corresponds to the stochastic control problem. Stochastic-control control logic 1004 and stochastic-control readout control logic 1014 can be implemented using classical control logic in some examples. Stochastic-control control logic 1004 can both supply a sequence of gate operations to act on qubits 1008a-b, and supply input 1002 to drivers 1006a-c. Stochastic-control control logic 1014 can accept outputs from sensors 1012a-b, and process these outputs to produce output 1016.

Drivers 1006a-c can control qubits, and also function as an on/off switch for interactions between qubits, and can be implemented via radio frequency pulse. Qubits 1008a-b are a two-state quantum-mechanical system, where a qubit can be in a superposition of both of these states simultaneously. Qubits 1008a-b can be constructed via a circuit comprising an inductor and a capacitor (sometimes referred to as an IC circuit). Coupler 1010 can perform electromagnetic coupling between qubits 1008a-b, and can be implemented with modulated capacitors, inductors, or microwave cavities. Sensors 1012a-b can interface between the quantum existence of qubits 1008a-b and the classical control logic of stochastic-control readout control logic 1014. For example, sensors 1012a-b can be implemented via a magnetometer or electrometer that can be coupled to the sensor's respective qubit, and then that can be processed by an amplifier or a comparator, which determines the larger before two voltages or amperages.

Figure 11:
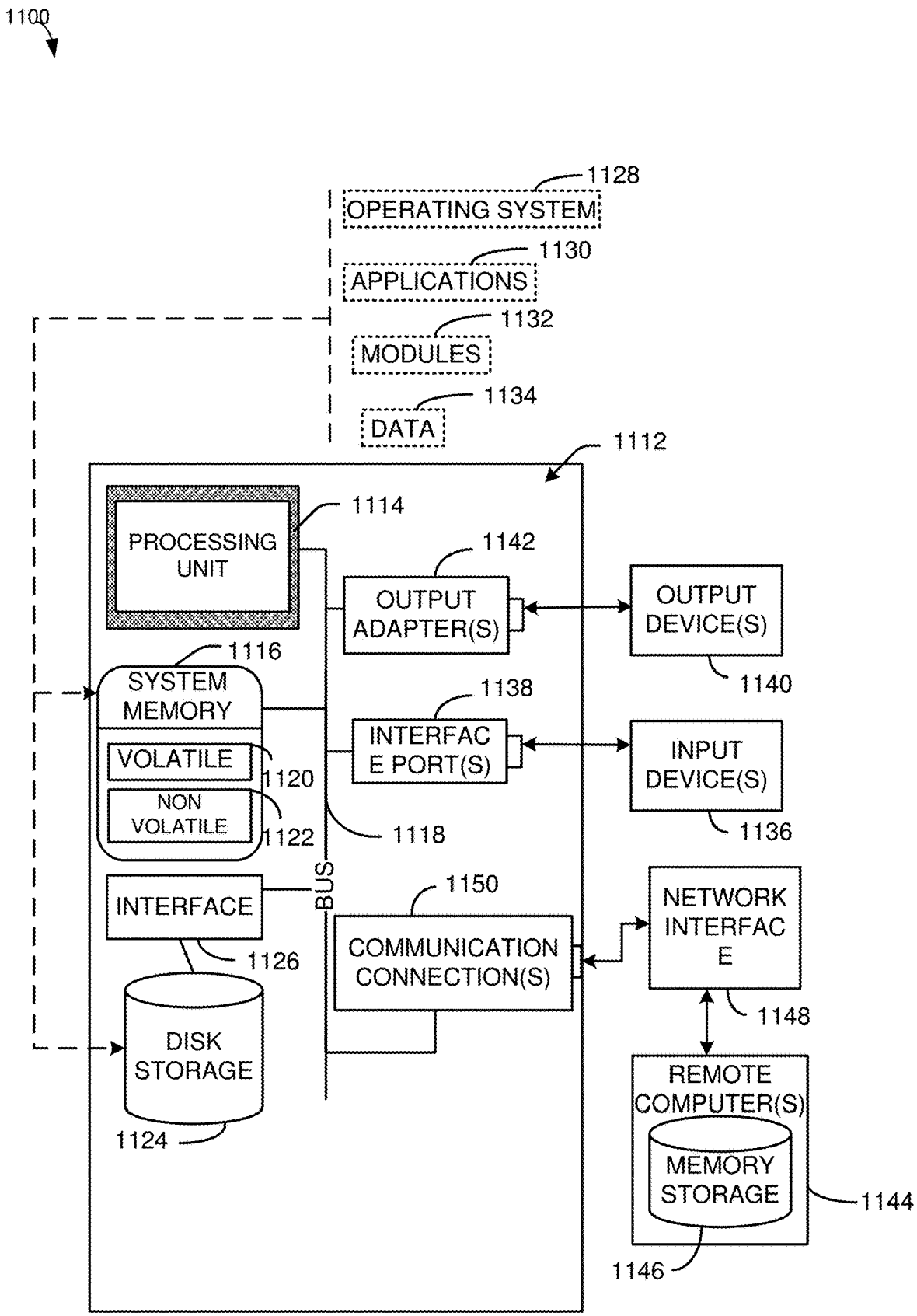
FIG. 11 illustrates a block diagram of an example, non-limiting operating environment in which one or more embodiments described herein can be facilitated.

FIG. 11 illustrates a block diagram of an example, non-limiting operating environment in which one or more embodiments described herein can be facilitated. Operating environment 1100 can be considered to be a classical computing environment (in contrast to a quantum computing environment). Aspects of operating environment 1100 can be used to implement stochastic-control control logic 1004 and stochastic-control readout control logic 1014 of FIG. 10.

In order to provide a context for the various aspects of the disclosed subject matter, FIG. 11 as well as the following discussion are intended to provide a general description of a suitable environment in which the various aspects of the disclosed subject matter can be implemented.

FIG. 11 illustrates a block diagram of an example, non-limiting operating environment in which one or more embodiments described herein can be facilitated. Repetitive description of like elements employed in other embodiments described herein is omitted for sake of brevity. With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a quantum computing device that prepares, via execution of a quantum computing circuit, a quantum state that represents a stochastic control problem; and
   a classical computing device that determines parameters for the quantum computing circuit, wherein the determining the parameters comprising compressing the quantum computing circuit by determining an order of Y-rotations by Y-rotation gates acting on qubits of the quantum computing device associated with the quantum computing circuit; and wherein the quantum computing device entangles, via execution of the compressed quantum computing circuit with the parameters, a first set of qubits of the quantum computing device associated with a first time with a second set of qubits of the quantum computing device associated with a second time that is after the first time.

2. The system of claim 1, wherein a policy-scenario tree that corresponds to the stochastic control problem has a first size, and a quantity of qubits of the quantum computing circuit has a second size, the second size being logarithmically smaller than the first size.

3. The system of claim 1, wherein the quantum computing circuit comprises a parameterized quantum computing circuit.

4. The system of claim 1, wherein the quantum computing circuit utilizes amplitude estimation or a Monte Carlo simulation to determine an objective value of the stochastic control problem.

5. The system of claim 4, wherein the objective value of the stochastic control problem comprises a cost of the stochastic control problem.

6. The system of claim 1, wherein the quantum computing device swaps a first information stored in a first qubit and a second information stored in a second qubit as part of compiling the quantum computing circuit to a nearest-neighbor qubit topology.

7. The system of claim 6, wherein the first qubit and the second qubit are physically located next to each other in the quantum computing circuit.

8. A computer-implemented method, comprising:
preparing, by a quantum computing device of a computing system, via executing a quantum computing circuit, a quantum state that represents a stochastic control problem;
determining, by a classical computing device of the computing system, parameters for the quantum computing circuit, wherein the determining the parameters comprising compressing the quantum computing circuit by determining an order of Y-rotations by Y-rotation gates acting on qubits of the quantum computing device associated with the quantum computing circuit; and
entangling, by the quantum computing device, via executing the compressed quantum computing circuit with the parameters, a first set of qubits of the quantum computing device associated with a first time with a second set of qubits of the quantum computing device associated with a second time that is after the first time.

9. The computer-implemented method of claim 8, wherein the quantum state further represents a policy of the stochastic control problem.

10. The computer-implemented method of claim 9, wherein the quantum state further represents a scenario tree of the stochastic control problem.

11. The computer-implemented method of claim 8, further comprising:
representing, by the quantum computing device, via executing the compressed quantum computing circuit with the parameters, a decision corresponding to the stochastic control problem with one or more qubits that are prepared by applying one or more gates.

12. The computer-implemented method of claim 11, further comprising:
representing, by the quantum computing device, via executing the compressed quantum computing circuit with the parameters, an uncertainty corresponding to the stochastic control problem with one or more of the qubits that are prepared by applying one or more gates.

13. The computer-implemented method of claim 8, further comprising:
entangling, by the quantum computing device, via executing the compressed quantum computing circuit with the parameters, the second set of qubits with the first set of qubits and a third set of qubits associated with a third time that is different from the first time and the second time.

14. A computer program product, the computer program product comprising a computer readable storage medium having program instructions embodied therewith, the program instructions executable by a computer system comprising a quantum computing device and a classical computing device to cause the computer system to at least:
prepare, by the quantum computing device, via execution of a quantum computing circuit, a quantum state that represents a stochastic control problem;
determine, by the classical computing device, parameters for the quantum computing circuit, wherein the determining the parameters comprising compressing the quantum computing circuit by determining an order of Y-rotations by Y-rotation gates acting on qubits of the quantum computing device associated with the quantum computing circuit; and
entangle, by the quantum computing device, via execution of the compressed quantum computing circuit with the parameters, a first set of qubits of the quantum computing device associated with a first time with a second set of qubits of the quantum computing device associated with a second time that is after the first time.

15. The computer program product of claim 14, wherein the quantum computing circuit comprises a first qubit that corresponds to a decision of the stochastic control problem, and wherein the program instructions are further executable by the computer system to cause the computer system to at least:
apply, by the quantum computing device, via execution of the compressed quantum computing circuit with the parameters, an initial uncontrolled Y-rotation with a known angle.

16. The computer program product of claim 14, wherein the qubits correspond to an uncertainty of the stochastic control problem, and wherein the program instructions are further executable by the computer system to cause the computer system to at least:
prepare, by the quantum computing device, via execution of the quantum computing circuit, the quantum state of the qubits so that the quantum state of the qubits follows a known multivariate distribution or a stochastic process.

17. The computer program product of claim 14, wherein the quantum computing circuit determines estimated parameters for the quantum computing circuit, and wherein the program instructions are further executable by the computer system to cause the computer system to at least:
determine, by the classical computing device, the parameters for the quantum computing circuit based on the estimated parameters.

18. The computer program product of claim 14, wherein the qubits correspond to an uncertainty of the stochastic control problem, and wherein the program instructions are further executable by the computer system to cause the computer system to at least:

prepare, by the quantum computing device, via execution of the compressed quantum computing circuit with the parameters, the qubits so that a plurality of random variables that corresponds to measuring the qubits follows a target distribution.

19. The computer program product of claim 14, wherein the program instructions are further executable by the computer system to cause the computer system to at least:

swap, by the quantum computing device, a first information stored in a first qubit and a second information stored in a second qubit as part of compiling the quantum computing circuit to a nearest-neighbor qubit topology.

20. A system, comprising:

a quantum computing device that prepares, via execution of a quantum computing circuit, a quantum state that represents a stochastic control problem, the quantum state corresponding to a quantity of qubits of the quantum computing device, the stochastic control problem corresponding to a policy-scenario tree that has a first size, wherein the quantity of qubits is logarithmically smaller than the first size;

a classical computing device that determines parameters for the quantum computing circuit, wherein the determining the parameters comprising compressing the quantum computing circuit by determining an order of Y-rotations by Y-rotation gates acting on the qubits of the quantum computing device associated with the quantum computing circuit, and wherein the quantum computing device entangles, via execution of the compressed quantum computing circuit with the parameters, a first set of qubits of the quantum computing device associated with a first time with a second set of qubits of the quantum computing device associated with a second time that is after the first time.

21. The system of claim 20, wherein the quantum computing circuit utilizes amplitude estimation or a Monte Carlo simulation to determine an objective value of the stochastic control problem.

22. The system of claim 20, wherein the quantum computing device swaps a first information stored in a first qubit and a second information stored in a second qubit as part of compiling the quantum computing circuit to a nearest-neighbor qubit topology.

23. A computer-implemented method, comprising:

preparing, by a quantum computing device of a computing system, via executing a quantum computing circuit, a quantum state that represents a stochastic control problem, the quantum state corresponding to a quantity of qubits, the stochastic control problem corresponding to a policy-scenario tree that has a first size, wherein the quantity of qubits is logarithmically smaller than the first size;

determining, by a classical computing device of the computing system, parameters for the quantum computing circuit, wherein the determining the parameters comprising compressing the quantum computing circuit by determining an order of Y-rotations by Y-rotation gates acting on the qubits of the quantum computing device associated with the quantum computing circuit; and entangling, by the quantum computing device, via executing the compressed quantum computing circuit with the parameters, a first set of qubits of the quantum computing device associated with a first time with a second set of qubits of the quantum computing device associated with a second time that is after the first time.

24. The computer-implemented method of claim 23, further comprising:

utilizing, by the quantum computing circuit, amplitude estimation to determine an objective value of the stochastic control problem.

25. The computer-implemented method of claim 23, wherein the quantum state further represents a policy of the stochastic control problem.

\* \* \* \* \*